(12) United States Patent
Kamibayashi et al.

(10) Patent No.: US 7,292,181 B2
(45) Date of Patent: Nov. 6, 2007

(54) MEMORY CHECK UNIT FOR RADAR SYSTEMS AND RADAR SYSTEM INCLUDING MEMORY CHECK UNIT

(75) Inventors: Teruhiko Kamibayashi, Kobe (JP); Yukio Ishikawa, Kobe (JP)

(73) Assignee: Fujitsu Ten Limited (JP)

( * ) Notice: Subject to any disclaimer, the term of this patent is extended or adjusted under 35 U.S.C. 154(b) by 97 days.

(21) Appl. No.: 11/182,516

(22) Filed: Jul. 15, 2005

(65) Prior Publication Data
US 2006/0038715 A1    Feb. 23, 2006

(30) Foreign Application Priority Data
Jul. 15, 2004  (JP)  ............... 2004-208654
Jul. 12, 2005  (JP)  ............... 2005-203134

(51) Int. Cl.
*G01S 7/40*    (2006.01)

(52) U.S. Cl. ..................... 342/165; 342/173

(58) Field of Classification Search ................. 342/165
See application file for complete search history.

(56) References Cited

U.S. PATENT DOCUMENTS

| | | | | |
|---|---|---|---|---|
| 3,739,385 A | * | 6/1973 | Bechtel et al. | ............... 343/705 |
| 4,559,626 A | * | 12/1985 | Brown | ..................... 714/719 |
| 5,538,141 A | * | 7/1996 | Gross et al. | ................. 209/571 |
| 5,603,412 A | * | 2/1997 | Gross et al. | ................. 209/571 |
| 5,895,443 A | * | 4/1999 | Gross et al. | ................. 702/120 |
| 6,496,946 B2 | * | 12/2002 | Bannatyne et al. | ........... 714/25 |
| 2002/0056056 A1 | * | 5/2002 | Bannatyne et al. | ........... 714/25 |

FOREIGN PATENT DOCUMENTS

| | | | | |
|---|---|---|---|---|
| JP | 04282482 A | * | 10/1992 | |
| JP | 2001-5735 A | * | 1/2001 | |
| JP | 2001133291 A | | 5/2001 | |
| JP | 2001221311 A | | 8/2001 | |

* cited by examiner

*Primary Examiner*—Thomas H. Tarcza
*Assistant Examiner*—Shelley Chen
(74) *Attorney, Agent, or Firm*—Gregory M. Taylor; Fogg & Powers LLC

(57) ABSTRACT

Provided is a RAM check unit capable of checking a RAM included in a radar system even when the radar system is in operation. An LSI instructs a high-frequency unit to output a radar-transmitted signal. When a radar-received signal is received from the high-frequency unit, calculation is performed based on the signal. The result of the calculation is transferred to a CPU. The CPU transmits a calculated distance to the outside. When a processing end sensing unit included in the LSI senses termination of radar-received signal processing, an RAM check unit initiates RAM check. When the RAM check is terminated, the high-frequency unit is instructed to output a radar-transmitted signal. Consequently, the RAM check is performed during a period between pieces of radar-received signal processing during which a load on the LSI is light. Thus, the RAM check can be performed even when the radar system is in operation.

6 Claims, 10 Drawing Sheets

MEMORY CHECK UNIT FOR RADAR SYSTEMS AND RADAR SYSTEM INCLUDING MEMORY CHECK UNIT

This application claims priority to Japanese Patent Application No. JP-2005-203134, filed Jul. 12, 2005 which claims priority to JP-2004-208654 filed Jul. 15, 2004.

BACKGROUND OF THE INVENTION

1. Field of the Invention

The present invention relates to a memory check unit that checks a memory (diagnoses whether the memory has a fault) included in a radar system. Moreover, the present invention is concerned with a radar system including the memory check unit.

2. Description of the Related Art

On-board millimeter-wave radar systems (refer to, for example, Patent Document 1) identify an object located in front of a vehicle, and detect the distance to the object and the relative velocity of the object. The results of the detection are employed in control of an inter-vehicle distance control unit or the like, whereby safety is ensured.

The millimeter-wave radar system modulates the frequency of a transmitted signal produced by a continuous-wave radar, irradiates the resultant signal to a place in front of a vehicle, and receives a signal reflected from a target. The millimeter-wave radar system then calculates the distance from the vehicle to the target and the velocity of the target on the basis of a beat between of the transmitted signal and the radar-received signal. During the calculation, a memory, for example, a random access memory (hereinafter an RAM) is used to store the beat frequencies.

RAM products have their qualities checked in the stage of manufacture and are thus screened in order to detect a defective part. After a RAM is included in a system, it may become defective due to time-sequential degradation or any other factor. As for a radar system, there is a demand for RAM check that can be executed even during operation of the radar system for the purpose of ensuring safety.

However, when the system is in operation, the RAM is accessed. Therefore, RAM check cannot be executed at any timing. Consequently, the RAM included in the system is checked at the time of starting up the system, in a maintenance mode, or on any other specific occasion but the RAM check is not executed while the system is in operation.

A fault diagnosis circuit capable of executing a RAM check even when a system is in operation has been proposed (Patent Document 2). The fault diagnosis circuit diagnoses a fault of a RAM on condition that the RAM is not accessed by the system.

(Patent Document 1) Japanese Patent No. 2594728
(Patent Document 2) Japanese Unexamined Patent Publication No. 2000-322330

However, Patent Document 2 does not clarify a criterion for verifying that a RAM is not accessed by a system.

Consequently, when a RAM check unit described in Patent Document 2 is merely included in a radar system, RAM check cannot be executed while the radar system is in operation.

SUMMARY OF THE INVENTION

An object of the present invention is to provide a RAM check unit capable of checking a RAM included in a radar system even when the radar system is in operation.

Another object of the present invention is to provide a radar system capable of checking a RAM even when the radar system is in operation.

In order to accomplish the foregoing object, according to the present invention, a memory check unit for radar systems comprises a processing end sensing means for sensing termination of radar-received signal processing, and a memory check means for, after the processing end sensing means senses termination of processing, initiating memory (including a RAM) check.

In a radar system, a radar-transmitted signal is intermittently irradiated. According to a memory check unit in which the present invention is implemented, after the radar-transmitted signal is irradiated, and when processing of a radar-received signal is terminated, a memory check is executed. After the memory check is terminated, irradiation of the next radar-transmitted signal is initiated. Consequently, while a memory is not accessed, the memory check can be executed. Consequently, while the radar system is in operation, memory check can be performed without affecting signal processing performed in the radar system.

A type of radar system is such that a crank mechanism converts a rotating motion of a motor into a reciprocating motion of an antenna, and a radar-transmitted signal is irradiated through the antenna while a target is being scanned with the signal. The second aspect of the present invention is concerned with this type of radar system including a means for sensing a reversal or a change of directions of reciprocation of an antenna for the purpose of initiating the action of a memory check means.

In the case of the-radar system, the transmitted signal is outputted when the antenna lies in the center of a movable range but is not outputted when the antenna lies at the ends of the movable range. In the radar system, after the transmitted signal is outputted, reception is performed. The reception is terminated responsively to a reversal made by the antenna. At the timing that the antenna makes a reversal, reception is recognized to be terminated and memory check is initiated. Moreover, the memory check is terminated before irradiation of the next radar-transmitted signal is initiated. Consequently, the memory check can be executed without affecting processing performed in the radar system.

According to the present invention, there is provided a memory check unit capable of checking a memory included in a radar system even when the radar system is in operation.

According to the present invention, there is provided a radar system capable of checking a memory even when the radar system is in operation.

BRIEF DESCRIPTION OF THE DRAWINGS

The present invention will be more clearly understood from the description as set forth below with reference to the accompanying drawings.

DESCRIPTION OF THE PREFERRED EMBODIMENTS

A radar system including a RAM check unit in which the present invention is implemented will be described using the drawings in relation to each of the embodiments.

Figure 1:
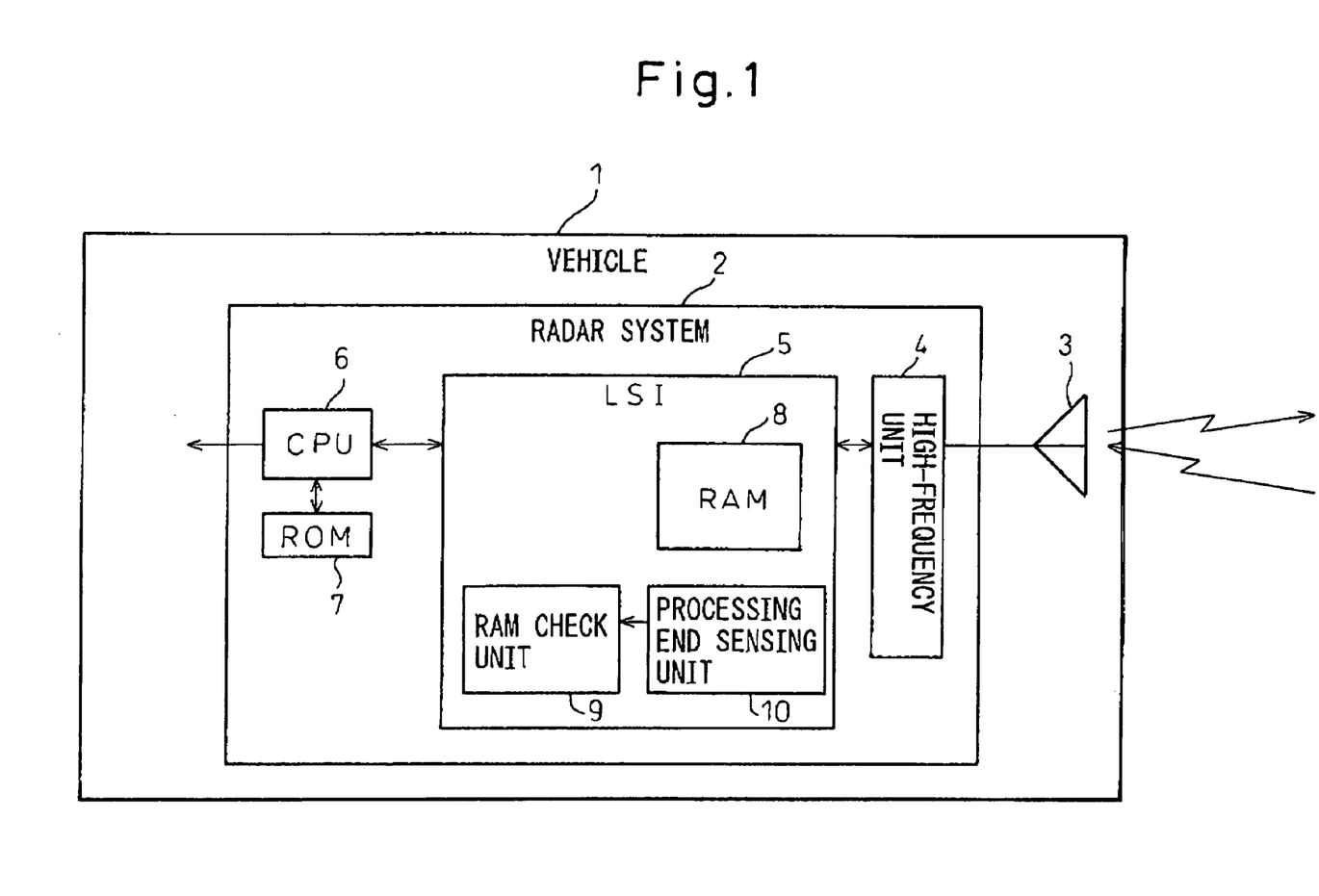
FIG. 1 shows the configuration of a radar system in accordance with the first embodiment of the present invention.

Referring to FIG. 1, the configuration of a radar system will be described below.

A radar system 2 is mounted in a vehicle 1. As for the radar system 2, the present invention can be adapted to various types of radar system including millimeter-wave radar system. Moreover, the present invention is not limited to an on-board type.

An antenna 3 that irradiates a radar-transmitted signal to a place in front of the vehicle 1 and receives a reflected signal is disposed in the frontal part of the vehicle 1. The radar system 2 comprises a high-frequency unit 4, a large-scale integration (LSI) 5, a CPU 6, and a ROM 7.

The high-frequency unit 4 transfers a radar-transmitted signal to the antenna 3 and receives a reflected signal via the antenna 3. The LSI 5 controls the timing that the high-frequency unit 5 transfers the radar-transmitted signal and transfers data, which is calculated based on the received signal sent from the high-frequency unit 4, to the CPU 6.

The CPU 6 acts based on programs stored in the ROM 7, calculates a distance or the like on the basis of the data sent from the LSI 5, and then transfers the calculated distance. The output of the radar 2 is utilized by a control system such as inter-vehicle distance control equipment (not shown) mounted in a vehicle.

The foregoing configuration of the millimeter-wave radar system 2 and the foregoing actions to be performed therein are well-known (refer to, for example, Patent Document 1), and an iterative description of the configuration and actions is omitted.

The LSI 5 produces beats of a transmitted signal to be irradiated from the millimeter-wave radar and a radar-received signal, and includes a RAM 8 in which the higher and lower frequencies of past beats are stored. A RAM check unit 9 that executes check of the RAM 8 and a processing end sensing unit 10 are incorporated in the LSI 15. The configuration and action of the RAM check unit 9 are well-known (refer to, for example, Patent Document 2). An iterative description of the configuration and action is therefore omitted.

Figure 2:
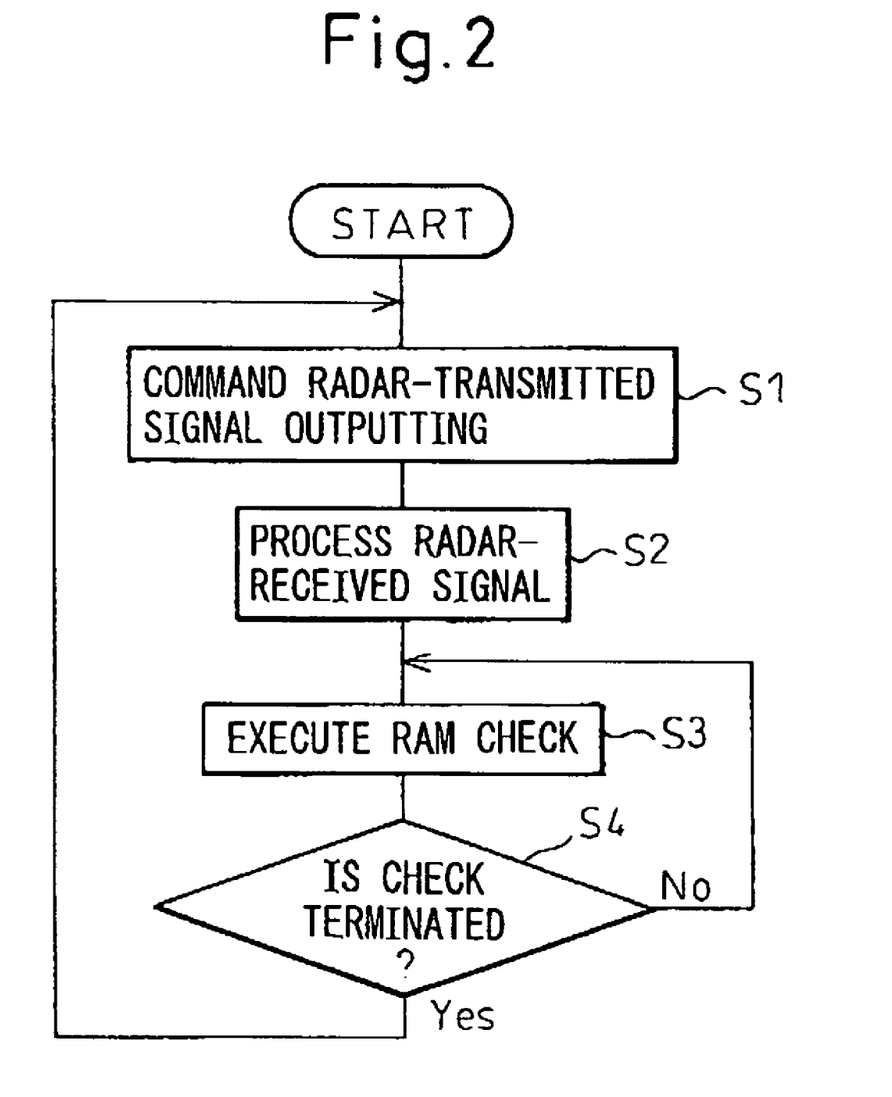
FIG. 2 is a flowchart describing actions to be performed in the radar system shown in FIG. 1.

Referring to the flowchart of FIG. 2 and the action diagram of FIG. 3, RAM check actions to be performed in the LSI 15 will be described below.

A radar-transmitted signal is intermittently outputted. When the LSI 15 starts up, the LSI 15 commands the high-frequency unit 4 to output a radar-transmitted signal (step S1). Consequently, the radar-transmitted signal is outputted via the antenna 3. When the LSI 5 receives a signal from the high-frequency unit 4, the LSI 5 initiates signal processing (step S2). Data calculated through radar-received signal processing is transferred to the CPU 6.

Radar-received signal processing is executed after outputting the transmitted signal is terminated. If the processing end sensing unit 10 senses termination of the radar-received signal processing, control is passed to step S3. The RAM check unit 9 executes check of the 8. When the RAM check is terminated (verification is made in the affirmative at step S4), control is returned to step S1. The high-frequency unit 4 is commanded to output the radar-transmitted signal.

Figure 3:
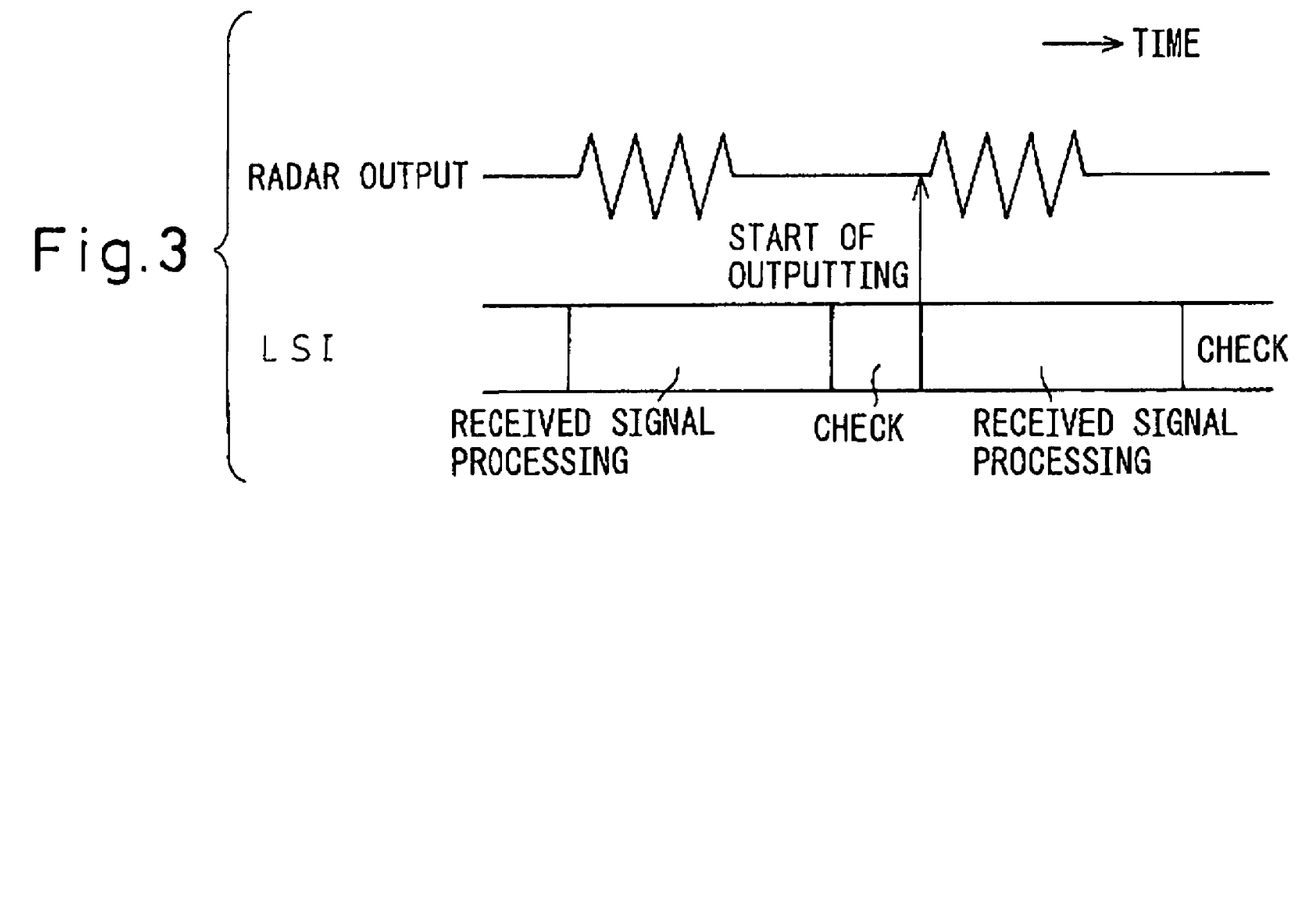
FIG. 3 is an explanatory diagram concerning the actions to be performed in the radar system shown in FIG. 1.

Consequently, as shown in FIG. 3, outputting the next radar-transmitted signal is initiated. When control is returned from step S4 to step S1, if an elapse of predetermined time is awaited, the cycle of outputting the radar-transmitted signal can be adjusted.

When the foregoing actions are repeated, radar-transmitted signal outputting and radar-received signal processing are terminated. A RAM check is executed at the timing when the load the LSI 5 incurs is light during a period preceding the next radar-transmitted signal outputting. Consequently, while the radar system 2 is in operation, fault diagnosis of the RAM can be performed without affecting other processing.

A type of radar system is such that a crank mechanism converts a rotating motion of a motor into a reciprocating motion of an antenna and a radar-transmitted signal is irradiated via the antenna while a target is being scanned with the signal. A description will be made of the second embodiment in which the present invention is adapted to this type of radar system using such antenna.

Figure 4:
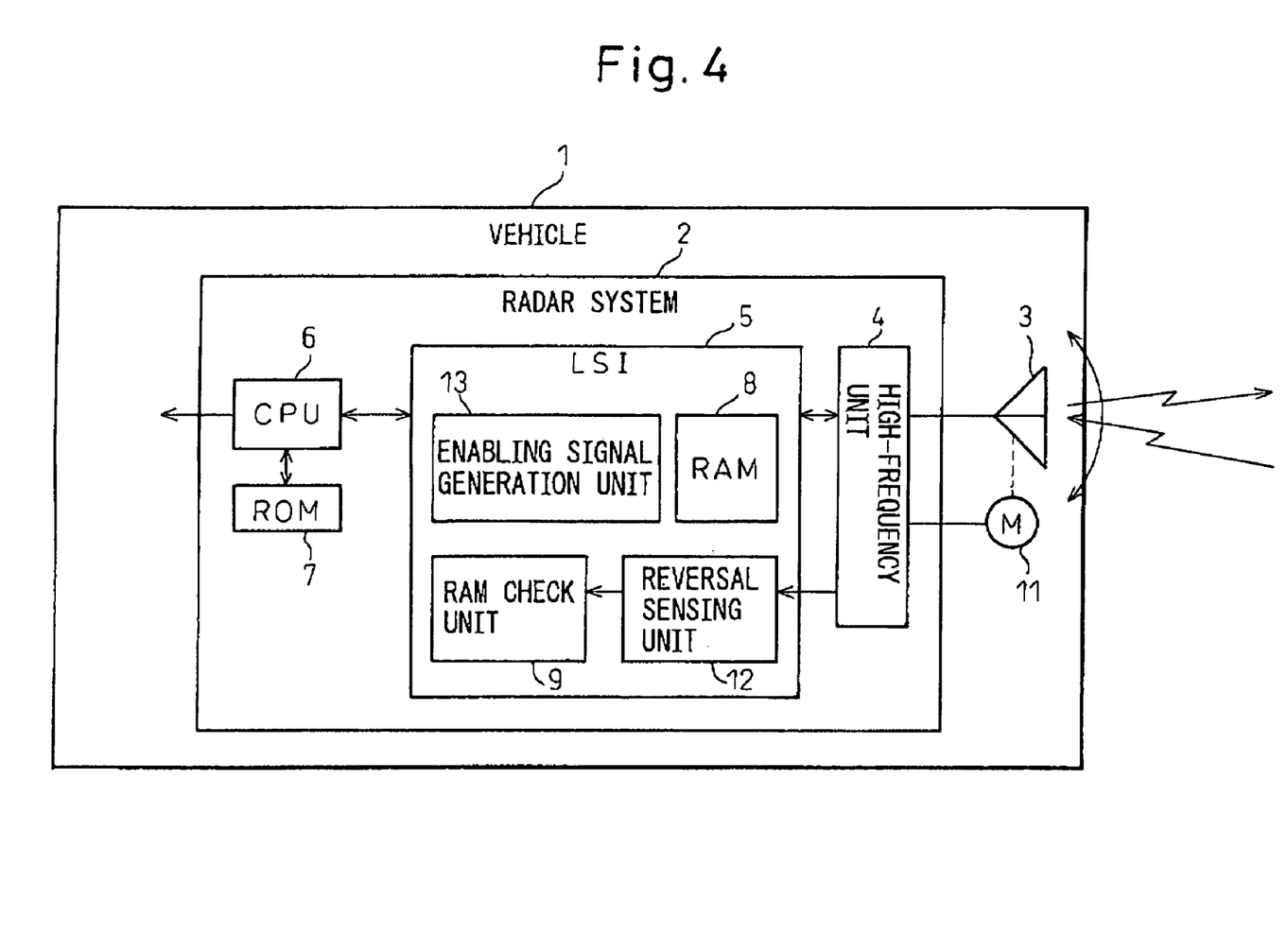
FIG. 4 shows the configuration of a radar system in accordance with the second embodiment of the present invention.

FIG. 4 shows the configuration of a radar system in accordance with the second embodiment. A radar system 2 shown in FIG. 4 has the same configuration as the radar system shown in FIG. 1. Only the difference from the radar system shown in FIG. 1 will be described and an iterative description will be omitted.

A motor 11 is included for causing the antenna 3 to make a reciprocating/alternating motion with the axis of rotation as a center. The high-frequency unit 4 drives or controls the motor 11. A reversal sensing unit 12 is substituted for the processing end sensing unit 10 shown in FIG. 1. FIG. 4 shows an enabling signal generation unit 13 that is employed in the third embodiment to be described later but not employed in the present embodiment.

When the antenna 3 makes a reciprocating/alternating motion while being driven and controlled by the high-frequency unit 4, a radar-transmitted signal is irradiated to the front of the vehicle 1 while a target is being horizontally scanned with the signal. The high-frequency unit 4 reverses the rotating motion of the motor 11 using a known crank mechanism or the like (refer to, for example, JPA-2001-221311). The reversal sensing unit 12 uses a signal sent from a known rotary encoder or the like (refer to, for example, JPA-2001-133291) attached to the antenna to sense the right and left limits of the reciprocating/alternating motion of the antenna 3.

Referring to the flowchart of FIG. 5 and the action diagram of FIG. 6, RAM check actions to be performed in the LSI 5 will be described below.

The antenna 3 makes a reciprocating/alternating motion along with the rotation of the motor 11. As shown in FIG. 6, the antenna 3 makes a reversal at the right and left ends of a movable range. As the antenna 3 moves unstably at the ends of the movable range, the high-frequency unit 4 outputs a radar-transmitted signal only when the antenna lies in the center of the movable range. Rader-received signal processing continues even after outputting a signal is terminated.

When the antenna 3 lies at the right and left ends of the movable range, an antenna 3 reversing signal is transmitted to the reversal sensing unit 12 included in the LSI 5.

In the second embodiment, the high-frequency unit 4 outputs a radar-transmitted signal and controls the reciprocating/alternating motion of the antenna 3 at unique timings irrespective of whether the LSI 5 gives instructions. The high-frequency unit 4 transfers a radar-received signal and a reversing signal to the LSI 5. Similarly to the LSI included in the first embodiment, when the LSI 5 receives a signal from the high-frequency unit 4, the LSI 5 processes the radar-received signal and transfers calculated data to the CPU 6.

The reversal sensing unit 2 waits until a reversing signal is received from the high-frequency unit 4 (step S11). When radar-received signal processing is terminated, the antenna 3 reaches the right or left end of the movable range. The high-frequency unit 4 transfers the reversing signal. When the reversal sensing unit 12 receives the reversing signal, the RAM check unit 9 initiates RAM check (step S13). When the RAM check is terminated (verification is made in the affirmative at step S14), control is returned to step S11. Reception of another reversing signal is awaited. The RAM check is terminated before the high-frequency unit 4 outputs the next radar-transmitted signal.

The foregoing actions are repeated, and the LSI 5 performs a RAM check during a period between one radar-received signal processing and the next radar-received signal processing during which the LSI 5 incurs a light load. Consequently, while the radar system 2 is in operation, fault diagnosis of the RAM can be performed without affecting other processing.

According to the second embodiment, every time the antenna 3 reaches one of the ends of the movable range, a RAM check is executed. In contrast, in the third embodiment, an enabling signal is used to adjust the cycle of a RAM check. A radar system in accordance with the third embodiment has the same configuration as the radar system shown in FIG. 4. The third embodiment is different from the second embodiment in the point that an enabling signal generation unit 13 is employed.

Referring to the flowchart of FIG. 7 and the action diagram of FIG. 8, RAM check actions to be performed in the LSI 5 will be described. Only the difference from the flowchart of FIG. 5 and the action diagram of FIG. 6 will be described below.

A rotation reversing signal is transferred every time the antenna 3 reaches the right or left end of the movable range. The enabling signal generation unit 13 generates one enabling signal every time the frequency of generation of the reversing signal reaches a predetermined number of times. In the example shown in FIG. 8, the enabling signal is produced along with every other generation of the reversing signal. The enabling signal is set to an on-state level at the timing preceding generation of the reversing signal and set to an off-state level after the elapse of a predetermined time.

Figure 5:
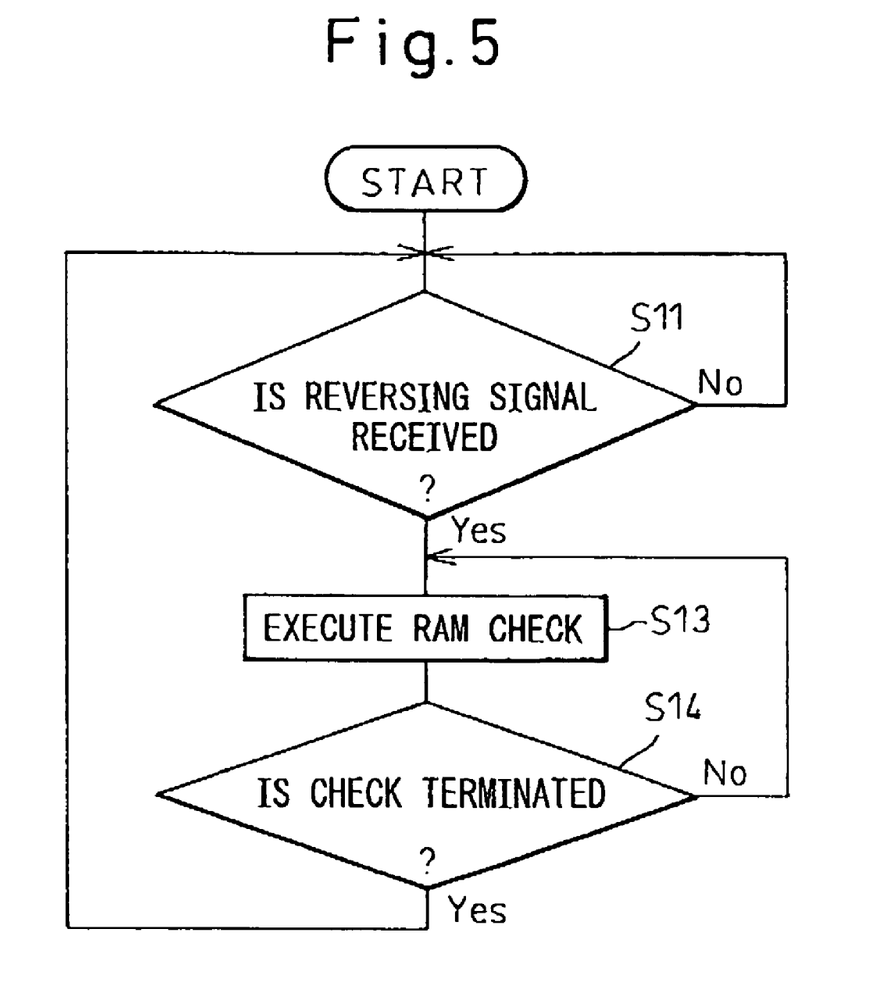
FIG. 5 is a flowchart describing actions to be performed in the radar system shown in FIG. 4.
Figure 6:
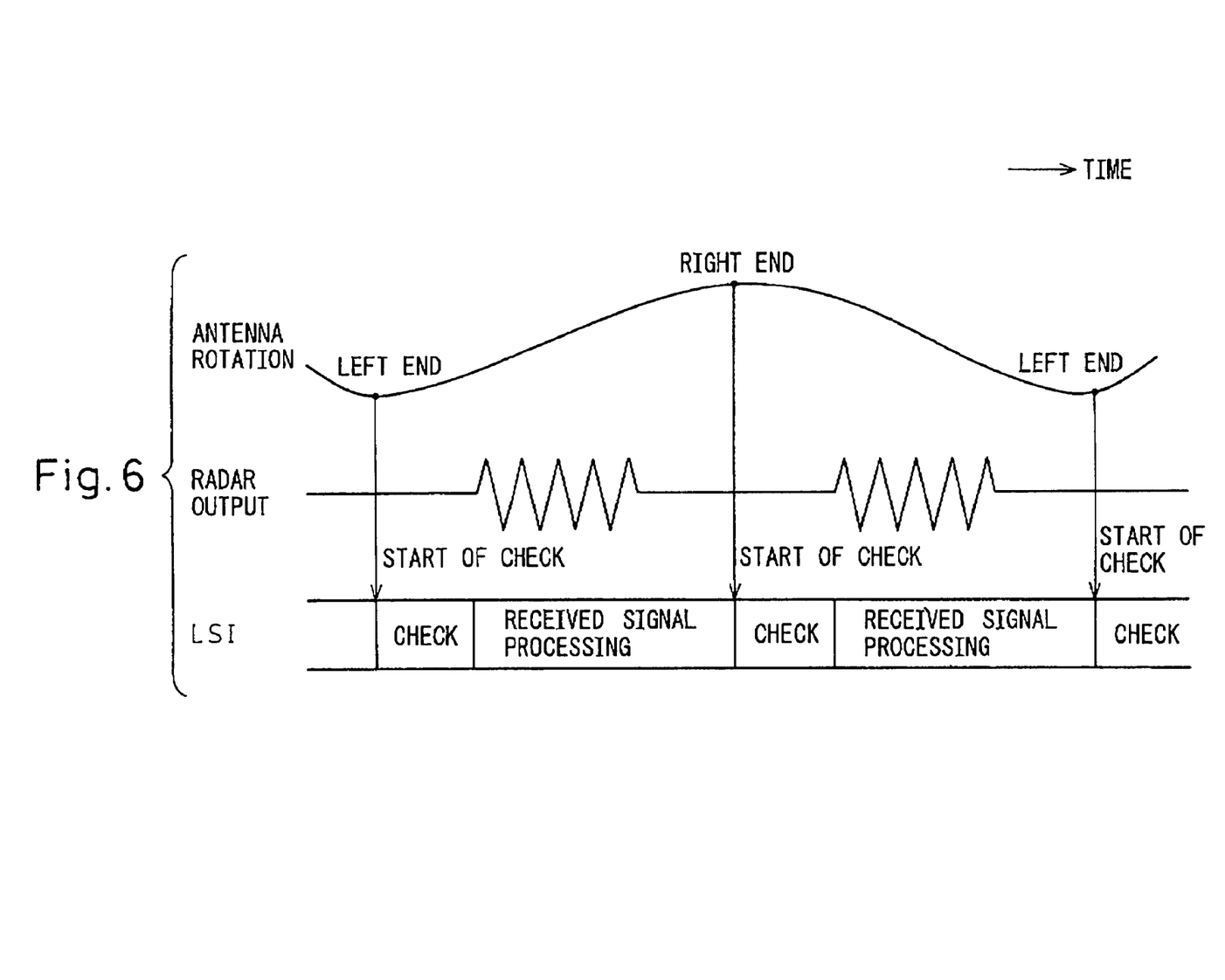
FIG. 6 is an explanatory diagram concerning the actions to be performed in the radar system shown in FIG. 4.
Figure 7:
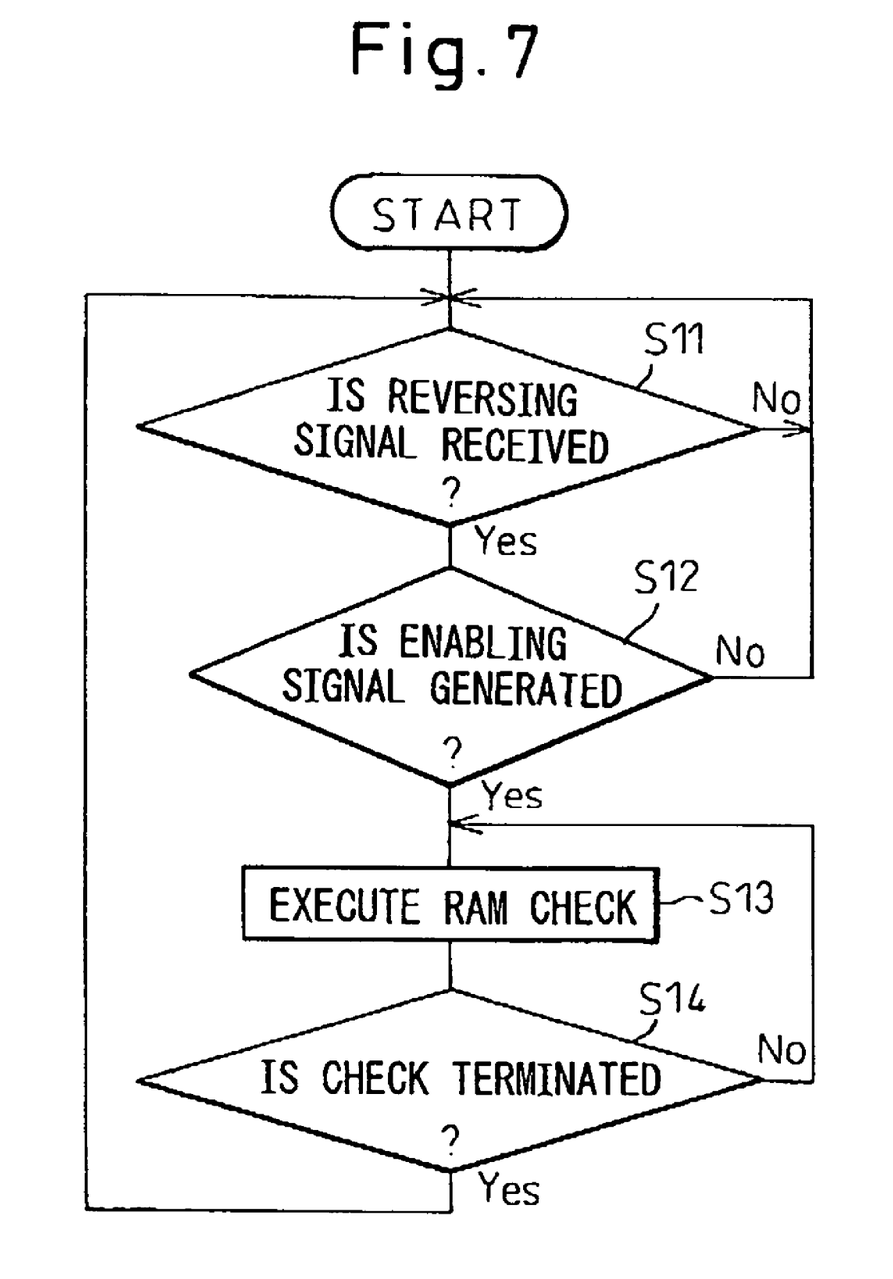
FIG. 7 is a flowchart describing actions to be performed in a radar system in accordance with the third embodiment of the present invention.

A difference of the flowchart of FIG. 7 from the one of FIG. 5 lies in the point that step S12 is inserted between step S11 of receiving the reversing signal and step S13 of executing a RAM check in order to verify whether the enabling signal is generated. Consequently, when the reversing signal is received, if the enabling signal is generated, a RAM check is executed. However, if the enabling signal is not generated, control is returned to step S11 in order to wait for reception of the next reversing signal.

Figure 8:
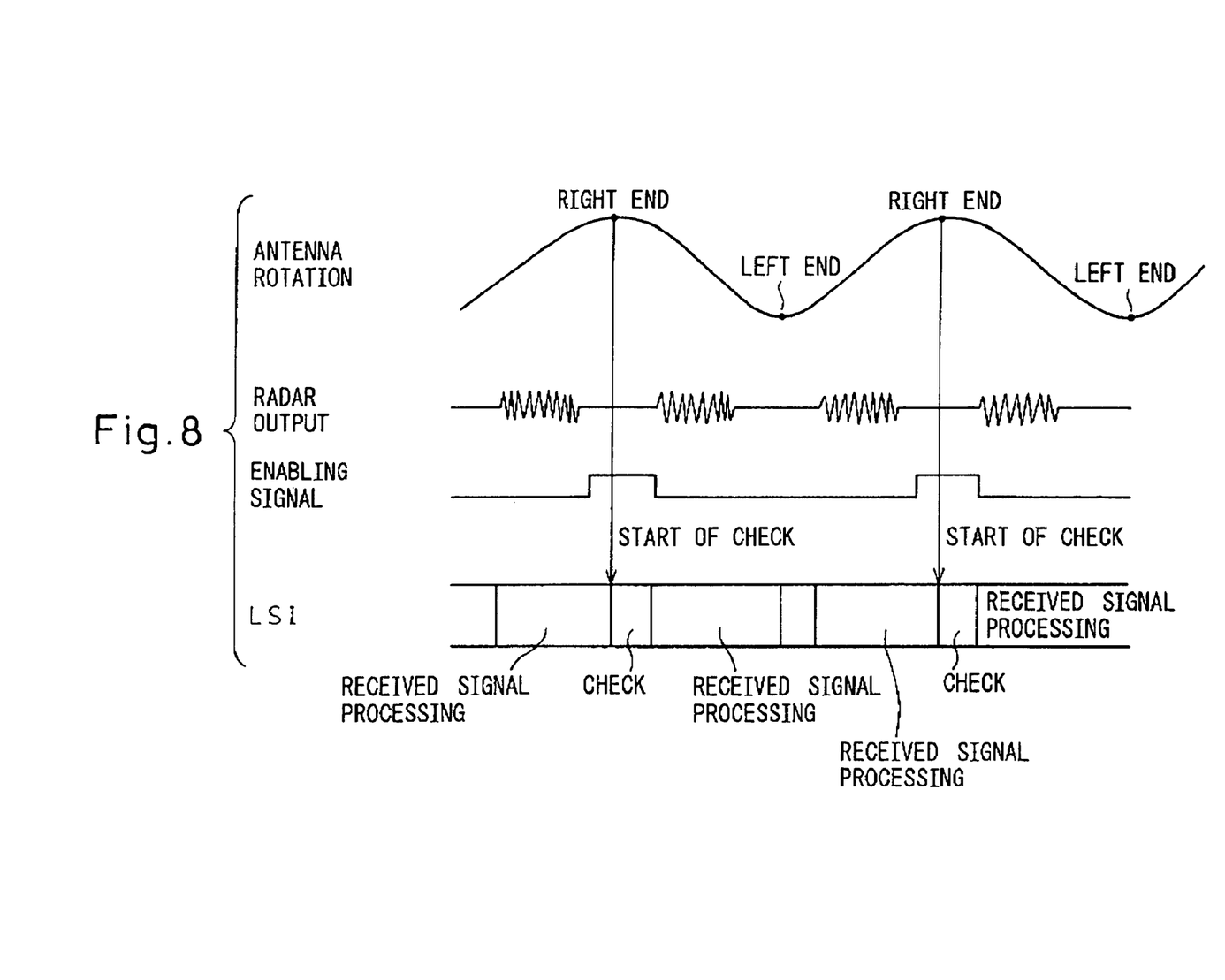
FIG. 8 is an explanatory diagram concerning actions to be performed in the radar system shown in FIG. 7.

In the example shown in FIG. 8, when the antenna 3 lies at the right end of the movable range, if the reversing signal is received, the enabling signal is generated. Consequently, a RAM check is executed. When the antenna 3 lies at the left end of the movable range, since the enabling signal is not generated, RAM check is not executed.

According to the third embodiment, the frequency of the RAM check can be adjusted. Moreover, a period during which RAM check is not performed can be utilized in order to perform processing other than RAM check. According to the fourth embodiment, suspension of RAM check with an interrupt is realized by adjusting the enabling signal employed in the third embodiment. If the load the LSI 5 incurs increases during execution of a RAM check, the RAM check should preferably be suspended by producing an interrupt.

In the fourth embodiment, suspension of a RAM check with an interrupt is realized by not generating the enabling signal. A radar system in accordance with the fourth embodiment has the same configuration as the one shown in FIG. 4. The fourth embodiment employs the enabling signal generation unit 13.

Referring to the flowchart of FIG. 9 and the action diagram of FIG. 10, processing to be performed if an interrupt is produced during execution of RAM check will be described below. Herein, only the difference between the flowchart of FIG. 7 and the action diagram of FIG. 8 will be described below.

Figure 9:
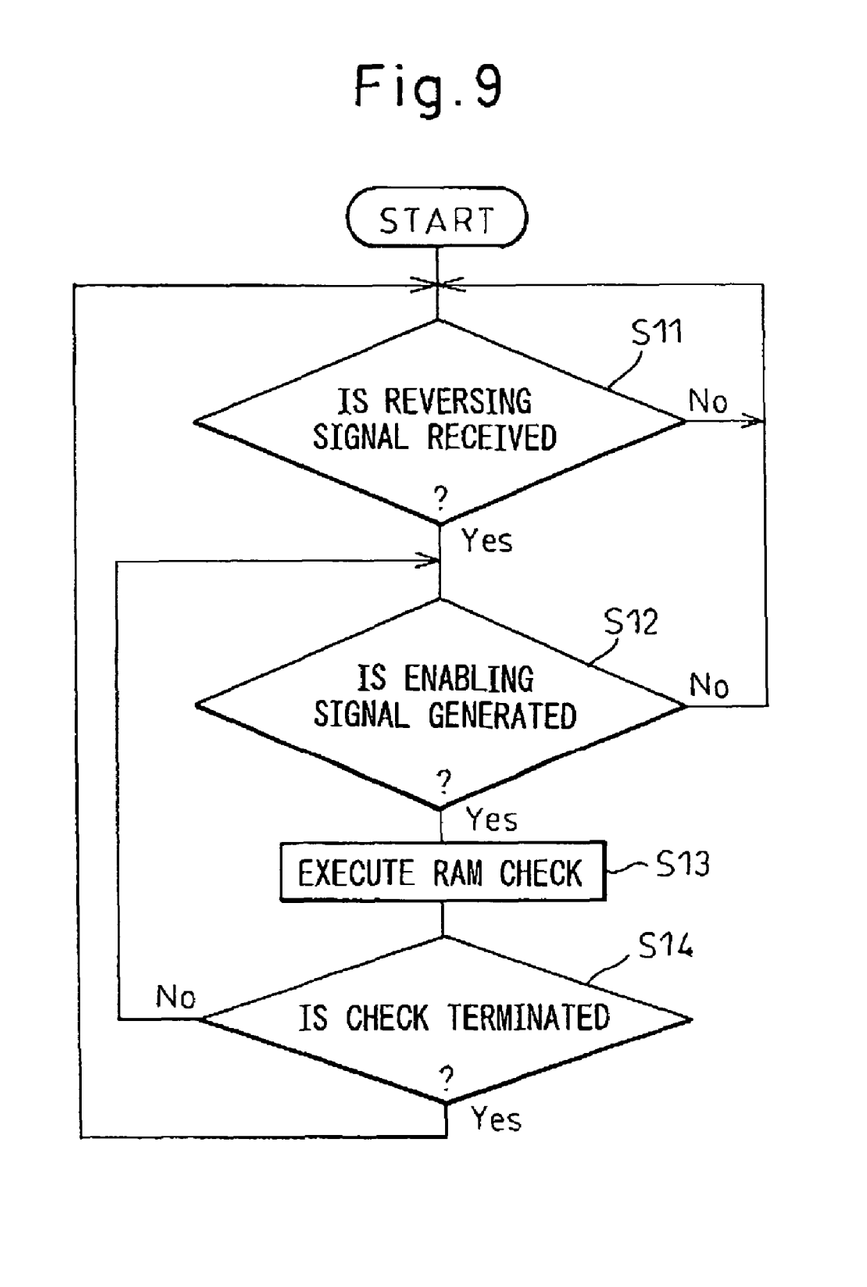
FIG. 9 is a flowchart describing actions to be performed in a radar system in accordance with the fourth embodiment of the present invention.

A difference of the flowchart of FIG. 9 from the flowchart of FIG. 7 lies in a point that control is passed from step S14 to step S12 in the course of a RAM check in order to verify whether the enabling signal is generated. If the enabling signal is not to be generated at step S12, control is passed to step S11. Whether a reversing signal is received is verified.

As long as no interrupt is produced during processing performed by the LSI 5, an enabling signal is continuously generated over a predetermined time. Therefore, when control is passed from step S14 to step S12, control is returned to step S13 and a RAM check is continued. This occurs at a time instant C shown in FIG. 10. Consequently, the enabling signal must be continuously generated until the RAM check is terminated.

Figure 10:
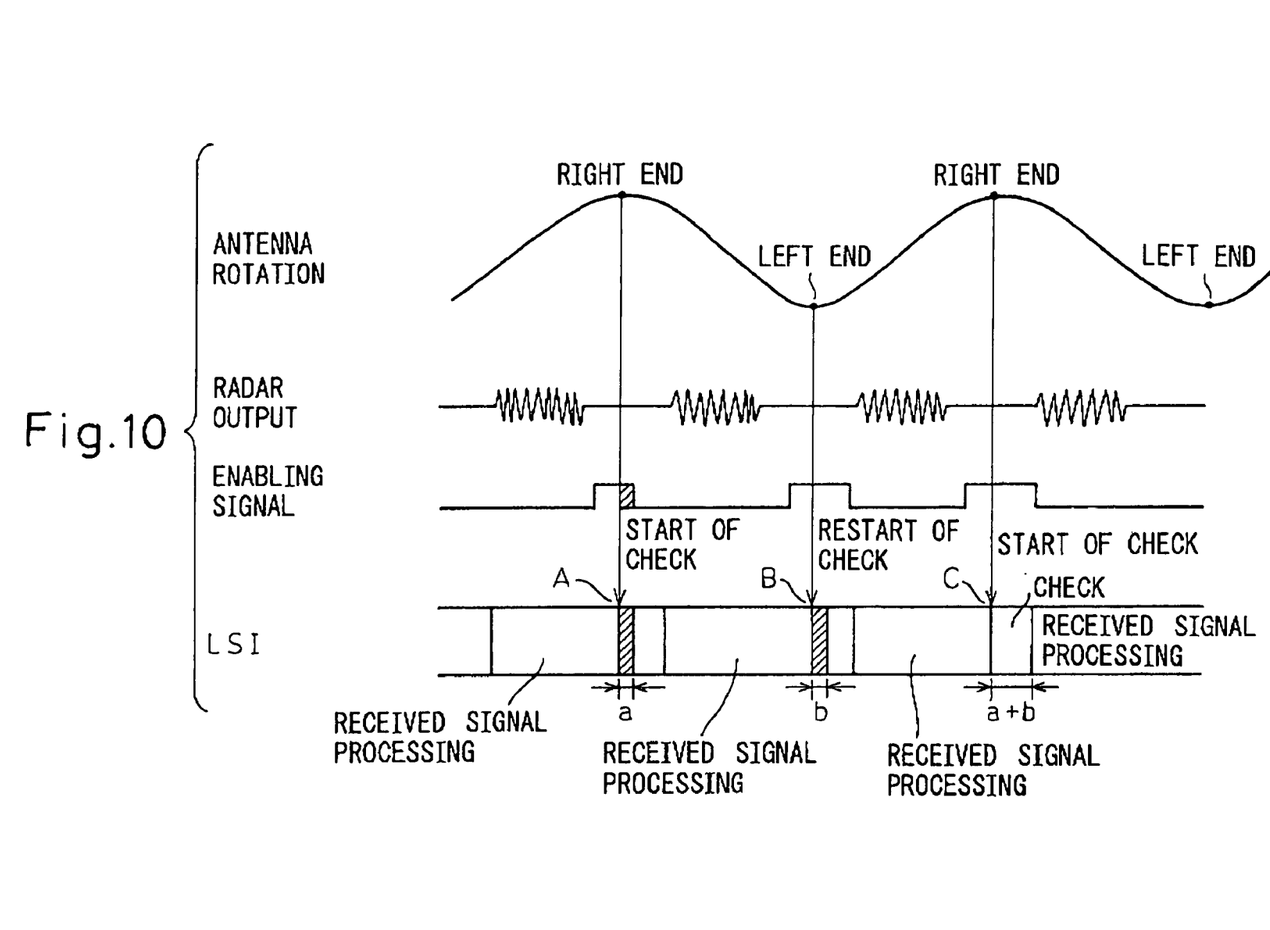
FIG. 10 is an explanatory diagram concerning the actions to be performed in the radar system shown in FIG. 9.

If an interrupt is produced during processing performed by the LSI 5, generation of the enabling signal is suspended (time instant A in FIG. 10). Consequently, when control is passed to step S12 in the course of a RAM check, as the enabling signal is not generated, control is passed to step S11. At this time, as a reversing signal is not received, the next detection of the reversing signal is awaited. The RAM check of step S13 is suspended with processing completed.

After the interrupt handling is terminated, an enabling signal is generated. Thereafter, when a reversing signal is detected (time instant B in FIG. 10), control is passed to step S13. A RAM check is then initiated. The RAM check is initiated with processing a, which is under way before suspension, terminated. The remaining radar-received signal processing b is performed.

According to the present embodiment, when an interrupt is produced, a RAM check can be suspended merely by ceasing generation of an enabling signal. After suspension is completed, RAM check is resumed from a point at which RAM check has been suspended. This leads to reduction in a RAM check time.

Incidentally, the aforesaid crank mechanism may not be used to realize a reciprocating/alternating motion of an antenna. Namely, the directions of rotation of a motor may be switched, and the reversal of the motor may be sensed.

The invention claimed is:

1. A memory check unit for a radar system that checks a memory included in the radar system having a motor which drives an antenna, comprising:
   an antenna reversal sensing means for sensing a reciprocating/alternating motion of the antenna caused by the motor; and
   a memory check means for initiating memory check when the reversal sensing means senses the reversal of the antenna.

2. The memory check unit for a radar system according to claim 1, further comprising a means for generating an enabling signal wherein, when the enabling signal is generated, if the antenna reversal sensing means senses the reversal of the antenna, the memory check means initiates a memory check.

3. The memory check unit for a radar system according to claim 2, wherein:
   when an interrupt is produced during a memory check, the enabling signal generating means suspends generation of the enabling signal so that memory check will be suspended; and
   when memory check is executed next time, the memory check is resumed from a point at which the memory check has been suspended.

4. A radar system including a memory check unit that checks a memory included in the radar system having a motor which drives an antenna, comprising:
   an antenna reversal sensing means for sensing a reciprocating/alternating motion of the antenna caused by the motor; and
   a memory check means for initiating memory check when the reversal sensing means senses the reversal of the antenna.

5. The radar system of claim 4, further comprising a means for generating an enabling signal wherein, when the enabling signal is generated, if the antenna reversal sensing means senses the reversal of the antenna, the memory check means initiates a memory check.

6. The radar system of claim 5, wherein:
   when an interrupt is produced during a memory check, the enabling signal generating means suspends generation of the enabling signal so that memory check will be suspended; and
   when memory check is executed next time, the memory check is resumed from a point at which the memory check has been suspended.

* * * * *